United States Patent
Leung et al.

(10) Patent No.: US 6,282,570 B1
(45) Date of Patent: Aug. 28, 2001

(54) MONITORING A LARGE PARALLEL DATABASE THROUGH DYNAMIC GROUPING AND SEQUENTIAL SAMPLING

(75) Inventors: Tony Kai-Chi Leung, San Jose; Siu Nang See, Milpitas; Stan Wong, San Jose; Cheung-Yuk Wu, Milpitas, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/206,503

(22) Filed: Dec. 7, 1998

(51) Int. Cl.[7] .......................... G06F 13/14; G06F 15/163; G06F 17/30; G06F 12/02

(52) U.S. Cl. .......................... 709/224; 709/224; 709/248; 707/200; 707/201

(58) Field of Search .................................... 709/224, 248; 717/8; 707/201, 200

(56) References Cited

U.S. PATENT DOCUMENTS

| | | | |
|---|---|---|---|
| 4,463,424 | 7/1984 | Mattson et al. | 711/136 |
| 5,325,530 | 6/1994 | Mohrmann | 717/4 |
| 5,497,486 | 3/1996 | Stolfo et al. | 707/7 |
| 5,524,253 | 6/1996 | Pham et al. | 709/202 |
| 5,579,515 | 11/1996 | Hintz et al. | 707/7 |
| 5,649,198 | 7/1997 | Shibata et al. | 709/100 |
| 5,870,608 | * 2/1999 | Gregory | 717/8 |
| 5,935,216 | * 8/1999 | Benner et al. | 709/248 |
| 5,938,729 | * 8/1999 | Cote et al. | 709/224 |
| 5,958,009 | * 9/1999 | Friedrich et al. | 709/224 |

FOREIGN PATENT DOCUMENTS

| | | |
|---|---|---|
| 0 646 883 A1 | 5/1995 | (EP) . |
| 09179834 | 12/1995 | (JP) . |
| WO 96/26488 | 8/1996 | (WO) . |

OTHER PUBLICATIONS

IBM Technical Disclosure Bulletin, "Method for Storing Large Objects in a Relational Database", 35(4A):72–75, (Sep. 1992).
IBM Technical Disclosure Bulletin, "Effective Approach to Query I/O Parallelism Using Sequential Prefetch and Horizontal Data Partitions", 36(09A):541–543 (Sep. 1993).
IBM Technical Disclosure Bulletin, "Client–Server Algorithm for Distributed Libraries", 35(2):352–356 (Jul. 1992).
IBM Technical Disclosure Bulletin, "Determining Database Object Authorization", 32(9B):335–337 (Feb. 1990).
Iyer, B., et al., "Percentile finding algorithm for multiple sorted runs", Proceedings of the Fifteenth International Conference on Very Large Data Bases, Amsterdam, Netherlands, 1 page (1989).
Frieder, O., et al., "Data distribution and query scheduling policies for a cube–connected multicomputer system", Second International Conference on Supercomputing Proceedings, San Francisco, CA, 1 page (1987).

* cited by examiner

Primary Examiner—Thomas Black
Assistant Examiner—Te Chen
(74) Attorney, Agent, or Firm—Janaki Komanduri; Ingrid Foerster (57) ABSTRACT

The present invention discloses a method, apparatus, and article of manufacture for monitoring performance of a parallel database in a computer. In accordance with the present invention, the parallel database is stored on a data storage device in the computer. Groups of database nodes are identified. Collection time periods for collecting performance statistics from the identified group of database nodes are determined. Performance statistics are periodically collected from a subset of each identified group of nodes during the collection time periods. The collected performance statistics are stored in a memory connected to the computer and re-used when collecting performance statistics from one or more groups of database nodes in a succeeding collection time period.

27 Claims, 6 Drawing Sheets

920 — SNAPSHOT BUFFER LIST (t5)
905 — 0   TS5 — 912 → 916
907 — 1   TS3 — 922 →
909 — 2   TS2 — 914 →
911 — 3   TS4 — 924 →

AFTER THE REQUEST NODE LIST FOR MONITORING PG 2 IS BUILT

902 — REQUEST NODE LIST
930 — 4
932 — 5
910 — 3

920 — SNAPSHOT BUFFER LIST (t6)
905 — 0   TS5    →
907 — 1   TS3    →
909 — 2   TS2    →
911 — 3   TS4    →
931 — 4   NULL   NULL
933 — 5   NULL   NULL

AFTER COLLECTING STATISTICS ON ALL 3 NODES IN PG 2

902 — REQUEST NODE LIST
930 — 4
932 — 5
910 — 3

920 — SNAPSHOT BUFFER LIST (t7)
905 — 0   TS5          →
907 — 1   TS3          →
909 — 2   TS2          →
911 — 3   TS8 — 924   → 916
931 — 4   TS6 — 936   → 916
933 — 5   TS7 — 938   → 916

AFTER THE REQUEST NODE LIST FOR MONITORING PG 3 IS BUILT

902 — REQUEST NODE LIST
908 — 2
906 — 1
904 — 0
930 — 4
932 — 5
910 — 3

920 — SNAPSHOT BUFFER LIST (t8)
905 — 0   TS5   →
907 — 1   TS3   →
909 — 2   TS2   →
911 — 3   TS8   →
931 — 4   TS6   →
933 — 5   TS7   →

AFTER COLLECTING STATISTICS NODE 2, 1, AND 0 IN PG 3

902 — REQUEST NODE LIST
908 — 2
906 — 1
904 — 0
930 — 4
932 — 5
910 — 3

920 — SNAPSHOT BUFFER LIST (t9)
905 — 0   TS11   →
907 — 1   TS10   →
909 — 2   TS9    →
911 — 3   TS8    →
931 — 4   TS6    →
933 — 5   TS7    →

MONITORING A LARGE PARALLEL DATABASE THROUGH DYNAMIC GROUPING AND SEQUENTIAL SAMPLING

BACKGROUND OF THE INVENTION

1. Field of the Invention

This invention relates in general to computer-implemented database management systems, and, in particular, to monitoring a large parallel database.

2. Description of Related Art

A database is a collection of stored data that is organized as tables. A table consists of rows and columns of data. The rows are formally called tuples. A database will typically have many tables and each table will typically have multiple tuples and multiple columns. The tables are usually stored on direct access storage devices (DASD) such as magnetic or optical disk drives for semi-permanent storage.

Databases generally have indexes, configuration files, and transaction logs. Database indexes contain a list of keywords for identifying a unique tuple. A database configuration file contains configuration information about the database and information about the database manager. Transaction logs contain a record of all transactions performed on the database.

A parallel database partitions a database over one or more nodes, e.g., from one to hundreds. A database partition is a part of a database. Database partitions have their own data, indexes, configuration files, and transaction logs. In a parallel database, the data in a table can be contained in one or more database partitions. Typically, when a table is on multiple partitions, some of its tuples are stored in one partition and some of its tuples are stored in other partitions. Such a division of a table is called horizontal partitioning.

Database performance is usually important to users. As used herein, the term user is a generic term for a computer user or an enterprise that maintains large amounts of data. Users may monitor the database performance of both non-parallel databases and parallel databases. Monitoring a database typically involves acquiring performance information from an interface exposed by a database instance and evaluating the information for threshold violations or "out of norm" conditions.

Monitoring a non-parallel database generally includes collecting performance statistics of a database. The performance statistics can be used to calculate a performance value for a non-parallel database, using, for example, a predefined formula. The performance value is then compared to a predefined threshold value. When monitoring the performance of a parallel database, some monitors collect performance data from a node and provide the user with a single performance value. Other monitors, referred to as summary monitors, access performance data from multiple nodes. These monitors are typically used when data from multiple nodes is essential to obtaining a meaningful result. For example, data from multiple nodes may be essential when calculating an average value or a maximum value. Hereinafter, the term monitor refers to a summary monitor.

Oftentimes, the monitor must collect the performance data from multiple nodes within a predefined time limit. During the time limit, the monitor may not be capable of collecting statistics from all of the partitioned databases. Overhead will be produced at the monitor to enable the collection of the monitoring statistics.

Turning on the performance statistics also reduces the performance of the database manager and lengthens the time of performing a transaction. Therefore, there is a need for a parallel database monitoring system that returns performance data to a user within a specified time limit and minimizes overhead.

SUMMARY OF THE INVENTION

To overcome the limitations in the prior art described above, and to overcome other limitations that will become apparent upon reading and understanding the present specification, the present invention discloses a method, apparatus, and article of manufacture for monitoring performance of a parallel database in a computer.

In accordance with the present invention, the parallel database is stored on a data storage device in the computer. Groups of database nodes are identified. Collection time periods for collecting performance statistics from the identified group of database nodes are determined. Performance statistics are periodically collected from a subset of each identified group of nodes during collection time periods. The collected performance statistics are cached and re-used when collecting performance statistics from one or more groups of database nodes in a succeeding collection time period.

An objective of an embodiment of the present invention is to increase the precision of monitoring results returned to a user after successive iterations of monitoring. A further objective of an embodiment of the present invention is to return the best results possible within a defined time limit and to minimize overhead across all nodes.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Environment

Figure 1:
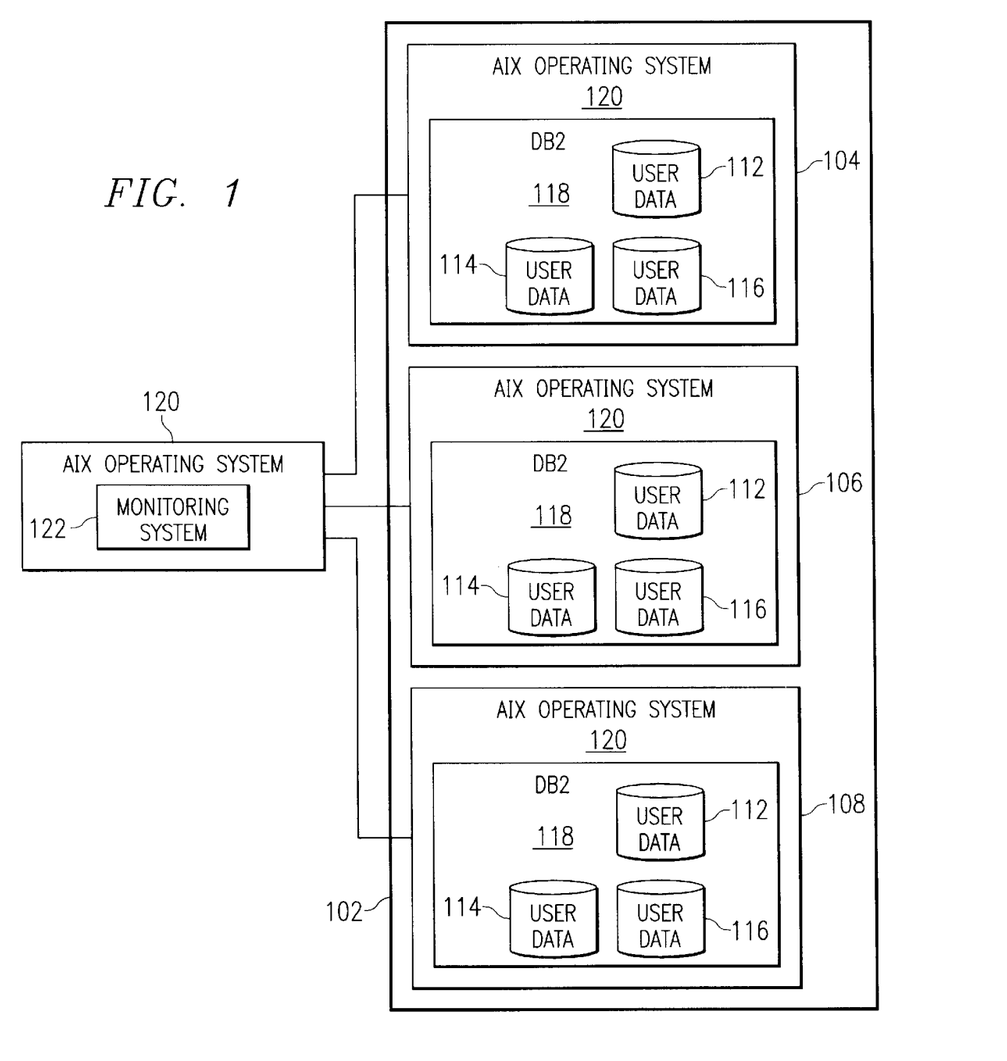
FIG. 1 illustrates an exemplary parallel database environment that could be used in accordance with the present invention.

FIG. 1 illustrates an exemplary parallel database environment that could be used in accordance with the present invention. The exemplary environment includes a computer system [102] that is comprised of one or more workstations [104, 106, and 108] and a database server that is comprised of one or more partitioned databases [112, 114, and 116]. Each workstation has multiple components, such as a central processing unit (CPU), an operating system, memory, data storage devices, data communications devices, a monitor, a mouse pointing device, and a keyboard.

Each workstation [104, 106, and 108] has Relational Database Management System ("RDBMS") software to manage one or more database partitions [112, 114, and 116] residing on that workstation. The RDBMSs in the parallel database environment work in a cooperative manner when transacting required access to data across multiple partitions in different workstations. RDBMS provides the function of performing search and retrieval functions in one or more relational databases. In the preferred embodiment of the present invention, the RDBMS software comprises the DB2 Universal Database Extended Enterprise Edition ("DB2") [118] offered by International Business Machines, Corp., Armonk, N.Y. for the AIX operating system [120]. Those skilled in the art will recognize, however, that the present invention has application to any RDBMS software.

The AIX operating system [120] provides an operating environment for the RDBMS software and the monitoring system [122]. The monitoring system [122] works in conjunction with the RDBMS software to monitor the performance of the parallel databases [112, 114, and 116]. The monitoring system [122] may be implemented in the AIX operating system [120] or it may be implemented in other operating environments.

Generally, the RDBMS software, the monitoring system [122], and the instructions derived therefrom, are all tangibly embodied in a computer-readable medium, e.g., data storage devices. Moreover, the RDBMS software, the monitoring system [122], and the instructions derived therefrom, are all comprised of instructions which, when read and executed by each workstation [104, 106, and 108] causes the workstations to perform the steps necessary to implement and/or use the present invention. Under control of the AIX operating system [120], the RDBMS software, the monitoring system [122], and the instructions derived therefrom, may be loaded from data storage devices into the memory of each workstation [104, 106, and 108] for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Architecture

Figure 2:
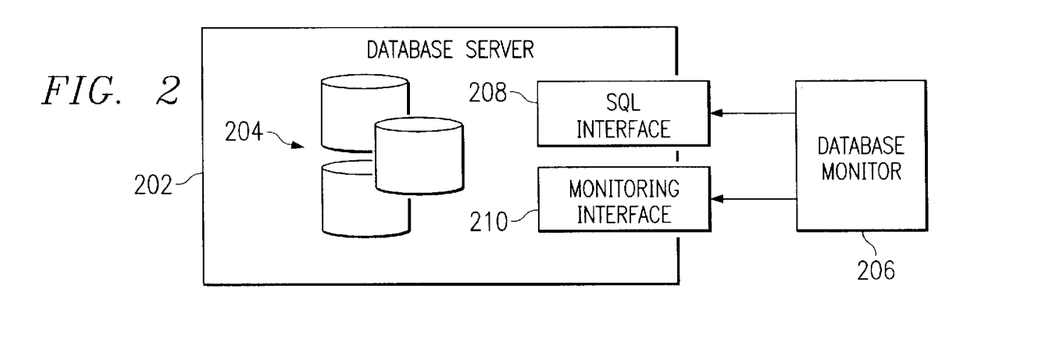
FIG. 2 illustrates a conventional non-parallel database monitoring system.

An example of non-parallel database monitoring is shown in FIG. 2. Monitoring a non-parallel database generally includes collecting performance statistics of a database. The performance statistics can be used in a predefined formula to calculate a performance value for a non-parallel database. The performance value is then compared to a predefined threshold value. The database server [202] contains a collection of databases [204]. The database monitor [206] collects the performance statistics based on instructions from the user. The database monitor [206] communicates with the server via a Structured Query Language ("SQL") interface [208] and a database monitoring interface [210]. Both the SQL interface [208] and the monitoring interface [210] allow the database monitor [206] to access some performance information about the collection of databases [204]. In particular, users define what the database monitor does (e.g., a user may define which database instance to monitor). For example, a user may want to monitor the performance of a particular table in a database. Specifically, the user may want to check whether a table increases beyond a certain number of rows. If the table increases beyond a certain number of rows, the user may want the database monitor [206] to prune the table. In both cases, the user defines what the database monitor [206] does.

The SQL interface [208] may not be capable of accessing all the performance data for the databases [204]. Some performance data is buried within the process of a particular database instance. Information buried within the process of a database instance could include the configuration of a database, the number of rollback statements, and/or the number of commit statements. The database monitor [206] accesses this information from the server via the monitor interface [210]. Users can instruct a database monitor [206] to access the monitoring interface.

Monitoring a parallel database is usually more involved than monitoring a non-parallel database. While enabling faster database operations, parallelism commonly introduces additional complexities in performing database administration tasks and monitoring the health of this type of database.

Figure 3:
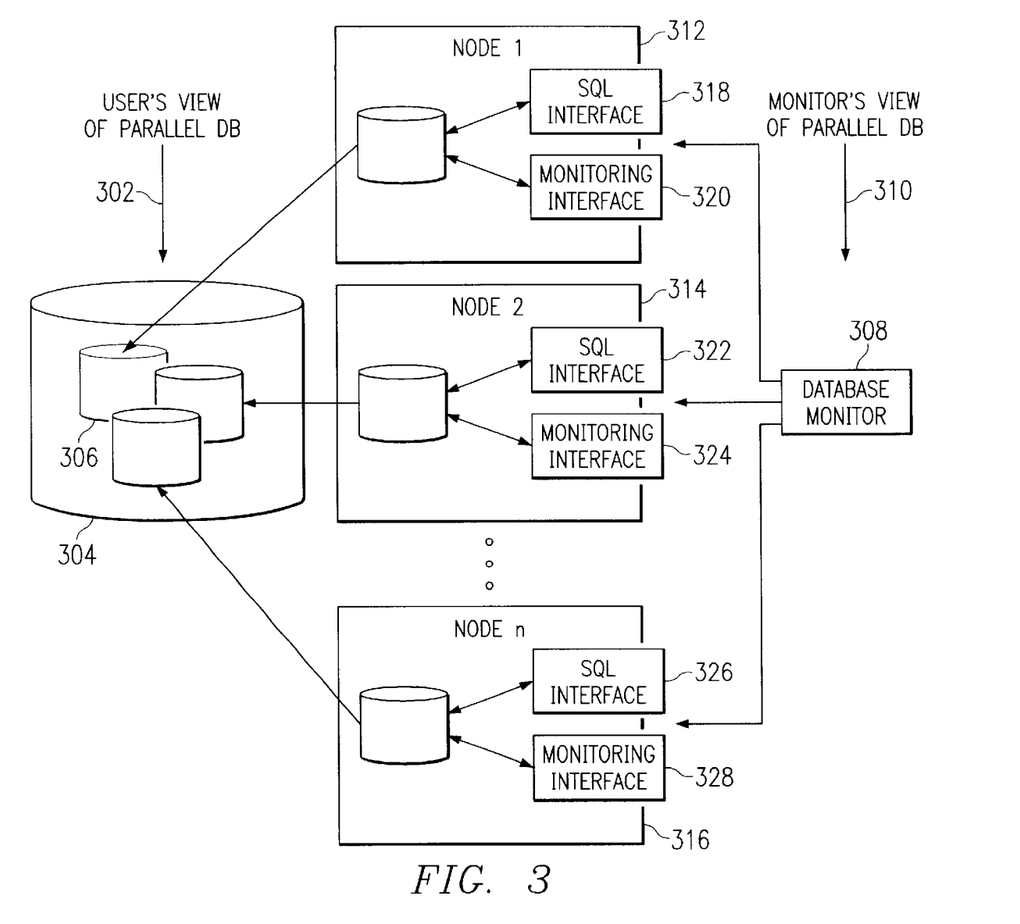
FIG. 3 illustrates an exemplary parallel database monitoring system that could be used in accordance with the present invention.

In DB2, a node may be a machine that has one or more partitioned databases. FIG. 3 shows an example of parallel database monitoring. Two views of the parallel database are shown. The user's view [302] is shown on the left side of FIG. 3. The user sees a database server [304] containing a collection of databases [306]. The parallel database monitor's view [310] is shown on the right side of FIG. 3. The parallel database monitor [308] ("monitor") sees Node 1 [312], Node 2 [314], and other nodes (as indicated by the ellipses) including Node n [316]. Each of the nodes [312, 314, and 316] contain database partitions and have SQL interfaces [318, 322, and 326], and monitoring interfaces [320, 324, and 328]. The monitor [308] collects performance data from each of the nodes [312, 314, and 316] and provides the user with a single performance value. It is to be understood that other embodiments may be utilized and structural changes may be made without departing from the scope of the present invention, e.g., the parallel database monitoring environment could include multiple monitors.

Monitoring a parallel database is complex because certain performance statistics, which are gathered from individual nodes [312, 314, and 316] may be useless unless they are compared to or summed against all the nodes [312, 314, and 316] within a specified time period. Moreover, there may be times when a user needs statistics from a subset of partitions of a database. For example, a partitioned database may be defined on nodes one through twenty. A user may want to (1) compare a performance value against all the partitions or (2) compare a performance value against partitions on nodes one through five or (3) compare a performance value against partitions on nodes ten through fifteen.

Figure 4:
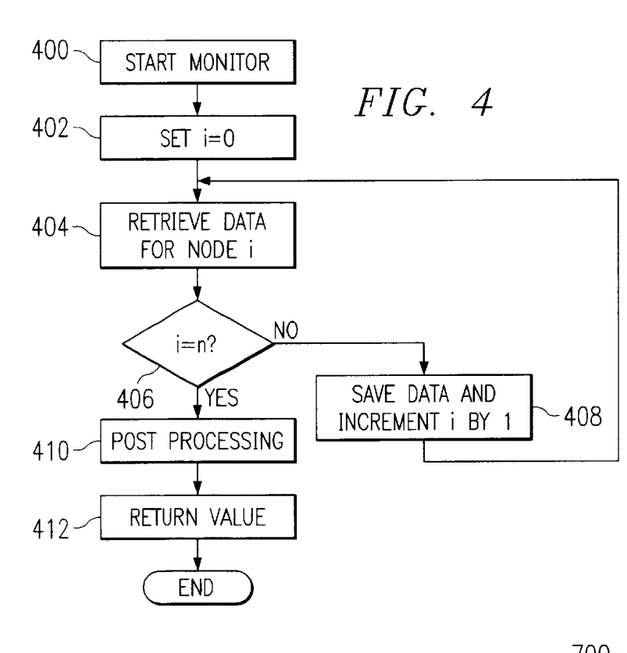
FIG. 4 is a flow diagram illustrating the steps performed by a conventional parallel database monitoring system.

FIG. 4 shows a flowchart that represents the typical steps performed when monitoring a parallel database system. The user instructs the database monitor [308] to start [block 400]. A counter variable "i" is set to zero [block 402]. The counter variable is the loop index and Node 0 represents the first node. The monitor [308] retrieves data from Node i [block 404]. The monitor [308] then decides whether the loop index is equal to "n" [block 406]. If the loop index is not equal to n, the monitor [308] has not processed all nodes. Accordingly, the monitor [308] saves the data collected from node i and increments the loop index by one [block 408]. Otherwise, if the loop index equals n, the monitor has processed all nodes. The monitor [308] performs post processing [block 410]. The monitor [308] returns the performance data to the user [block 412].

Figure 5:
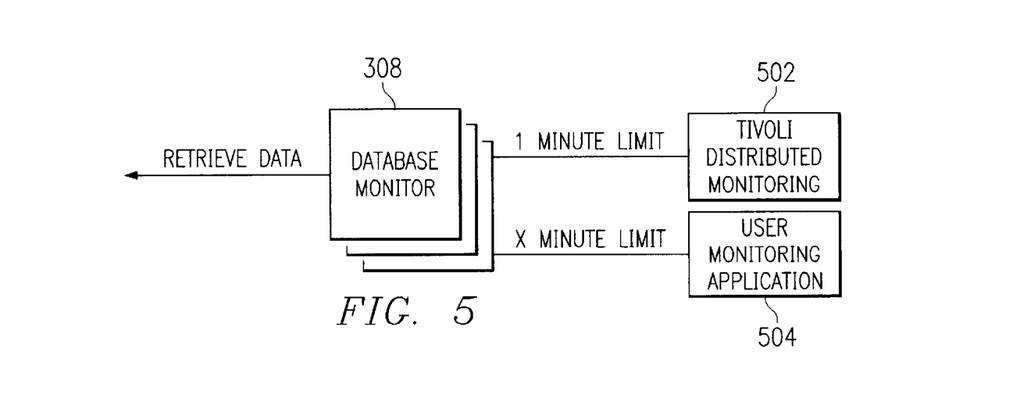
FIG. 5 illustrates exemplary monitor applications that could be used in accordance with the present invention.

Collecting monitoring statistics from a large parallel database introduces a scalability problem when the number of database nodes [312, 314, and 316] exceeds a certain limit. This limit may be introduced by the user's acceptable monitoring time, or by the parallel database monitor application. FIG. 5 shows exemplary monitoring applications that define time limits (or collection time periods) for collecting performance statistics. A time limit for collecting monitoring statistics may be defined by the monitoring application. The Tivoli Distributed Monitoring product [502] ("Tivoli product") is an exemplary monitoring application. The Tivoli product is offered by International Business Machines, Corp., Armonk, N.Y. It limits all monitors [308] to a maximum time of one minute to collect monitoring statistics and return a result (i.e., a performance value). If a monitor [308] does not return a result to the Tivoli product [502] within the one minute time limit, the Tivoli product [502] assumes that the monitor [308] failed. The Tivoli product [502] then alerts the user and proceeds to the next monitor [308] in a queue. Hence, the Tivoli product [502] can collect monitoring statistics from a limited number of database nodes [312, 314, and 316] within the one minute time limit. There are two reasons for the one minute time limit. First, the one minute time limit prevents an application from indefinitely waiting for data from a monitored object that is not operational. Second, the one minute time limit insures that the data collected for the time sensitive monitors is current.

However, the defined time limit may restrict the number of nodes [312, 314, and 316] from which monitoring statistics are collected. Thus, the user may not get the desired monitoring result because the monitor [308] may not be able to collect monitoring statistics from all the nodes of the parallel database within the defined time limit.

A user is able to customize the database monitoring via a user monitoring application [504]. For example, although the Tivoli distributed monitoring system [502] provides a maximum time limit of one minute, a user can provide a different time limit (i.e., a "x minute limit") to the database monitor [308] via the user monitoring application [504]. Within the user defined time limit, the monitor [308] will need to collect monitoring statistics from all the nodes of the parallel database or it will fail.

Monitoring A Large Parallel Database

The disclosed embodiment of the present invention provides a technique embodied in the monitoring system [122] for monitoring the performance of a parallel database. In particular, the monitoring system [122] uses dynamic grouping and sequential sampling to monitor parallel databases with a minimum amount of overhead. Additionally, new data structures support the dynamic grouping and sequential sampling.

Data Structures

Prior to discussing the monitoring system [122], a discussion of the data structures used by the monitoring system [122] to monitor parallel databases will be provided.

One key data structure is represented by a monitored object that contains relevant information about the entity to be monitored. The present invention uses the monitored object to store relevant information about a DB2 instance, DB2 partition, and/or DB2 partition group in the monitor application. The monitoring system [122] accumulates a collection of monitored objects and caches a list of DB2 instances, DB2 partitions, and DB2 partition groups to minimize the overhead in obtaining the monitored object information. The monitoring system [122] refreshes this cached list at a fixed interval (e.g., one hour) so that the list reflects the relatively current state of the monitored objects. The refreshed lists provide capability in supporting changes in the cached monitored objects, such as the number of database partitions in a partition group (dynamic grouping) and the DB2 version. The relevant information stored in the monitored object can be shared by multiple monitors [308]. The relevant information may also be re-used by one monitor [308] in subsequent executions of that monitor [308] without spending time to look up the monitored object for details.

Some of the fields used to track the monitored object information and support the dynamic grouping of DB2 partitions in monitoring systems [122] include the DB2 instance name, the database name, and a database node list that contains one or more database partitions, the number of databases (to indicate whether the database partitions in the partition group reside in more than one database which may impact post processing decision [see FIG. 4, block 410]) and the number of parallel database nodes (e.g., the number of DB2 parallel database nodes), the version of the parallel database (this allows the present invention to support multiple parallel database versions), the cached time, and a variable that indicates whether the database instance is a parallel database instance. An exemplary definition of fields used to track monitored objects is shown below.

| | |
|---|---|
| lstring | _DB2InstanceName; |
| int | _NumOfDBs; |
| lstring | _DBName; |
| int | _NumOfDB2Nodes; |
| lstring | _dbNodeList; |
| long | _db2Version; |
| lboolean | _instIsMPP; |
| long | _epTime; |

Another cached list is the list of monitoring processes that are established to communicate with DB2 instances within a local host. Each monitoring process communicates with one DB2 instance. The cached list records the process identification number and the corresponding DB2 instance so that monitors requesting services from the same DB2 instance can share the same monitoring process. Some of the fields used to track the monitoring processes with DB2 version awareness are: the name of the DB2 instance to be monitored, the DB2 version, a variable that indicates whether it is a parallel database environment, and the monitoring process identification number. An exemplary definition of fields is shown below.

| | |
|---|---|
| lstring | _Name; |
| long | _db2Version; |
| lboolean | _db2IsMPP; |
| long | _ServerID; |

To provide efficient monitoring in a large parallel database environment, the monitoring system [122] keeps a record of a user's monitoring request and the required settings. For example, DB2 requires one or more database statistics groups to be turned on to collect certain database statistics for a node. A switch manager can be used to track which database statistics groups and which nodes are being monitored. Each database statistic group is represented by a switch group. Exemplary switch groups in DB2 include buffer pool activity, lock information, sorting information (both internal and external), SQL statements (e.g., which SQL is being executed, number of rollbacks, etc.), table activity, and units of work. It is to be understood that other switch groups may be utilized without departing from the scope of the present invention.

Before a monitor [308] is run, the monitoring system [122] selects one or more snapshot switch groups if required by the monitor. The selected snapshot switch groups re turned on. If no monitor requires the use of the selected switches for a predefined period of time, an internal task is scheduled to turn off the snapshot switch to reduce the snapshot overhead. In the DB2 parallel environment, each node has its own set of snapshot switches. The status of the snapshot switch is either 1=on or 0=off.

A one dimensional array is used to store the status of the switches. The array represents one node in a DB2 instance. Each element of the array represents a snapshot switch. If the monitoring system [122] processes monitors [308] that reference multiple nodes, each node will be represented by a different one dimensional array and is added to a sorted collection. This sorted collection of one dimensional arrays may be shared by multiple monitors [308]. The monitoring system [122] reuses the data stored in the sorted collection of one dimensional arrays to check if any snapshot switches need to be set for subsequent monitor runs.

The following structure is used to maintain the DB2 snapshot switches in the parallel environment. The number of database partition groups and the number of nodes in each group are represented by integer data types. The name of a database instance is represented by a character string data type. A list of exemplary variables is shown below:

| | |
|---|---|
| int | _NumOn[SQL_PDB_MAX_NODE][SQLM_NUM_GROUPS]; |
| lstring | _InstName; |

Once the required settings of a monitor [308] are completed, the monitoring system [122] can proceed to get the performance data for that monitor [308]. When a monitor [308] requests a snapshot of performance data from multiple nodes, multiple snapshot buffers will be referenced to extract the correct data elements. Each snapshot call returns all data elements in that database statistic group. To minimize the overhead of retrieving excessive data from each snapshot call and to increase the performance of processing each monitor, the snapshot results are grouped and cached in memory. In the DB2 parallel environment, there is a snapshot buffers list that maintains a list of snapshot buffers of specific types, such as DB2 instance snapshot, DB2 database snapshot, etc. A snapshot buffer pointer for a node will be set when a snapshot is retrieved for that node. The snapshot data buffer list also has a time stamp registered to record the time at which the snapshot was taken. Monitors [308] requesting a snapshot of performance data from the same snapshot group in the same DB2 node will share the data cached in the common snapshot data buffer. When a monitor is distributed to a new node, the new node is added to the common snapshot buffer list with a snapshot buffer pointer pointing to the snapshot buffer after data is collected for that node. Since there may be multiple monitors sharing a snapshot buffer, the buffer must be protected as a synchronized object. A class is defined that represents a snapshot node. The class includes the selected node number, the last sample time, the address of the snapshot buffer, the buffer size, and the format of the snapshot buffer. A sample class is shown below.

| | |
|---|---|
| int | _Node; |
| Time | _LastSampleTime; |
| unsigned char | *_SnapshotBuffer, |
| unsigned long | _BufferSize; |
| struct sqlma | *_sqlma; |

Monitoring Performance

With the data structures described above, the parallel database monitoring system [122] uses sequential sampling and dynamic grouping to monitor parallel databases with minimum overhead. A DB2 parallel database environment is used herein to demonstrate how sequential sampling and dynamic grouping can be implemented. It is to be understood that other parallel database environments may be utilized without departing from the scope of the present invention.

Sequential sampling involves systematically collecting performance data from a group of database nodes based on the available resources and a specified time limit, e.g., a monitor application specified time limit. The number of nodes in the group sampled may fluctuate depending upon the work load on the system. Within the specified time limit, each monitor [308] collects statistics from as many of the monitored nodes as possible. The collected data from each node is then cached and shared with other monitors or used in a future execution of the same monitor.

In sequential sampling, the sampling size is adjusted dynamically to adapt itself to the changes in the resource constraints. Resource constraints are related to changes in the database activity and changes in the central processing unit ("CPU") workload.

Because the monitor [308] collects performance data from as many nodes as it can during a specified time limit, the monitor [308] may not be able to collect all of the performance data during a first monitor run. For example, assume a group of database nodes contains ten nodes. As used herein, a group of database nodes (or database partition groups) refers to a logical grouping of one or more database nodes that can be changed dynamically by a user without impacting the monitor [308] distributed to that group. During a first monitor run, a monitor may only collect performance data from nodes one through seven within the specified time limit. The performance data collected during the first run may not accurately reflect the performance of the ten node database group. During a second run, the monitor can collect performance data from the remaining nodes eight through ten. Based on the available resources and the specified time limit, the monitor will also refresh some data from nodes one through seven. The combination of data collected from the first and second run can now more accurately reflects the performance of the nodes one through ten. After a number of monitor runs, more precise monitor results can be returned to the user. This technique is especially useful for monitors requiring post processing in a large parallel database in which availability of data from all requested nodes is essential in obtaining a meaningful result.

Monitors requiring post processing can include deviation monitors, summation monitors, average monitors, minimum monitors, and maximum monitors. Table 1 lists sample monitors requiring post-processing.

TABLE 1

| MONITOR TYPE | EXAMPLE |
| --- | --- |
| Deviation | Row distribution in a set of nodes |
| Summation | Number of deadlocks found in a set of nodes to determine if there is any contention problem in the database throughout the entire monitoring period |
| Average | Average number of static and dynamic SQL statements attempted in a set of nodes |
| Minimum | Minimum number of static and dynamic SQL statements attempted among a set of nodes |
| Maximum | Maximum number of static and dynamic SQL statements attempted among a set of nodes |

Figure 6:
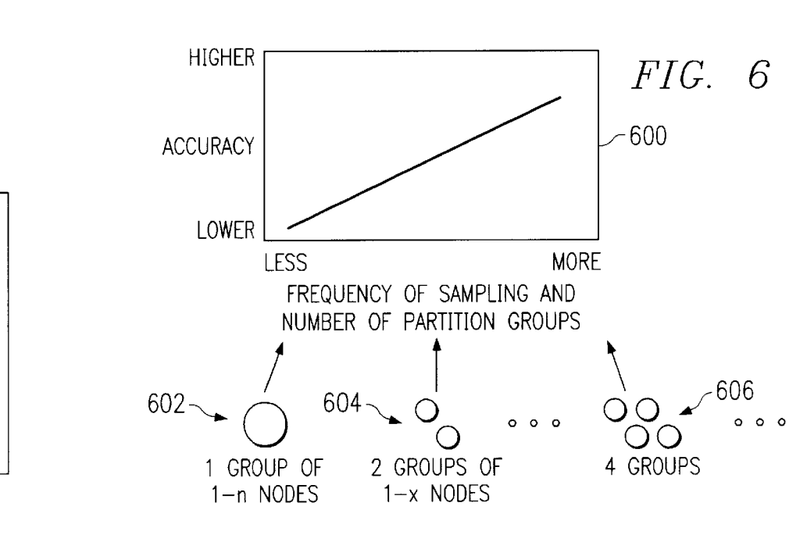
FIG. 6 is an exemplary graph of the degree of monitored data accuracy.

Generally, the accuracy of the collected performance data is related to the number of database partition groups. FIG. 6 is an exemplary graph [600] of the performance data accuracy. The graph [600] displays the accuracy versus the frequency of sampling and the number of database partition groups. The graph [600] shows that when the sample frequency is low (long intervals between sampling) and the number of partition groups is small, the precision of the monitored data is low. On the other hand, when the sample frequency is high and the number of partition groups is large, the precision of the monitored data is high.

For example, the accuracy is low when the database is partitioned into one partition group [602] containing nodes one through n, and the one group is sampled once every hour. The accuracy is improved when the database containing n partitions is monitored using two partition groups [604], with one group containing nodes 1 through x, and the other group containing nodes x+1 through n. Each group is sampled once every hour. The accuracy is further improved when the database containing n partitions is monitored using four partition groups [606], with the first group containing nodes 1 through x; the second group containing nodes x+1 through y; the third group containing nodes y+1 through z; and the fourth group containing z+1 through n. Each group is sampled once every hour. Concerning the frequency of sampling (or the sample time period), the monitor may choose any sample time period, e.g., once every hour, once every thirty minutes, or once every fifteen minutes. In addition, the monitor may choose to collect data from a different database partition group during each sample time period. In the four group case, the monitor could collect data from group 1 during the first sample time period, collect data from group 2 during the second time period, etc. Alternatively, the monitor could collect a limited amount of data from all four groups during each sample time period. Note, that graph 600 is not meant to show a linear progression.

Figure 7:
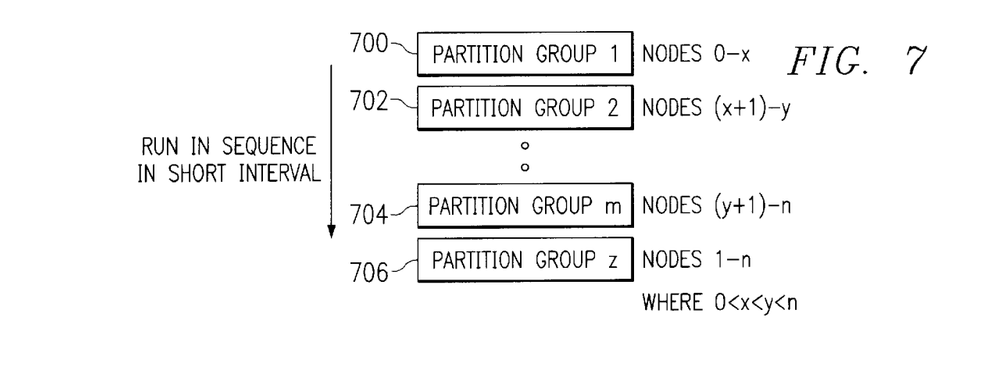
FIG. 7 illustrates an exemplary accuracy control technique.

To create the highest accuracy possible, multiple partition groups which together cover all nodes are created and one partition group containing all nodes is created. FIG. 7 is a diagram that illustrates the multiple partition group case. Partition group 1 [700] contains nodes 0 to x. Partition group 2 [702] contains nodes (x+1) to y. Partition group m [704] contains nodes (y+1) to n. Partition group z [706] contains nodes 1 to n. In FIG. 7, y is less than n and x is less than y, i.e., 0<x<y<n. The monitor [308] collects performance data from each partition group [700, 702, 704, and 706] in a serial manner. The monitor [308] may also collect performance data from each partition group [700, 702, 704, and 706] in a parallel manner. Data is reused from partition groups. Namely, partition group 2 [702] uses the data collected from partition group 1 [700], partition group 3 [704] uses the data collected from partition group 2 [702], and partition group z [706] uses data collect from the previous partition groups [700, 702, and 704]. The monitor for partition group z contains values for all nodes and can be used to reflect the performance value of all the partitions of the parallel database.

Figure 8:
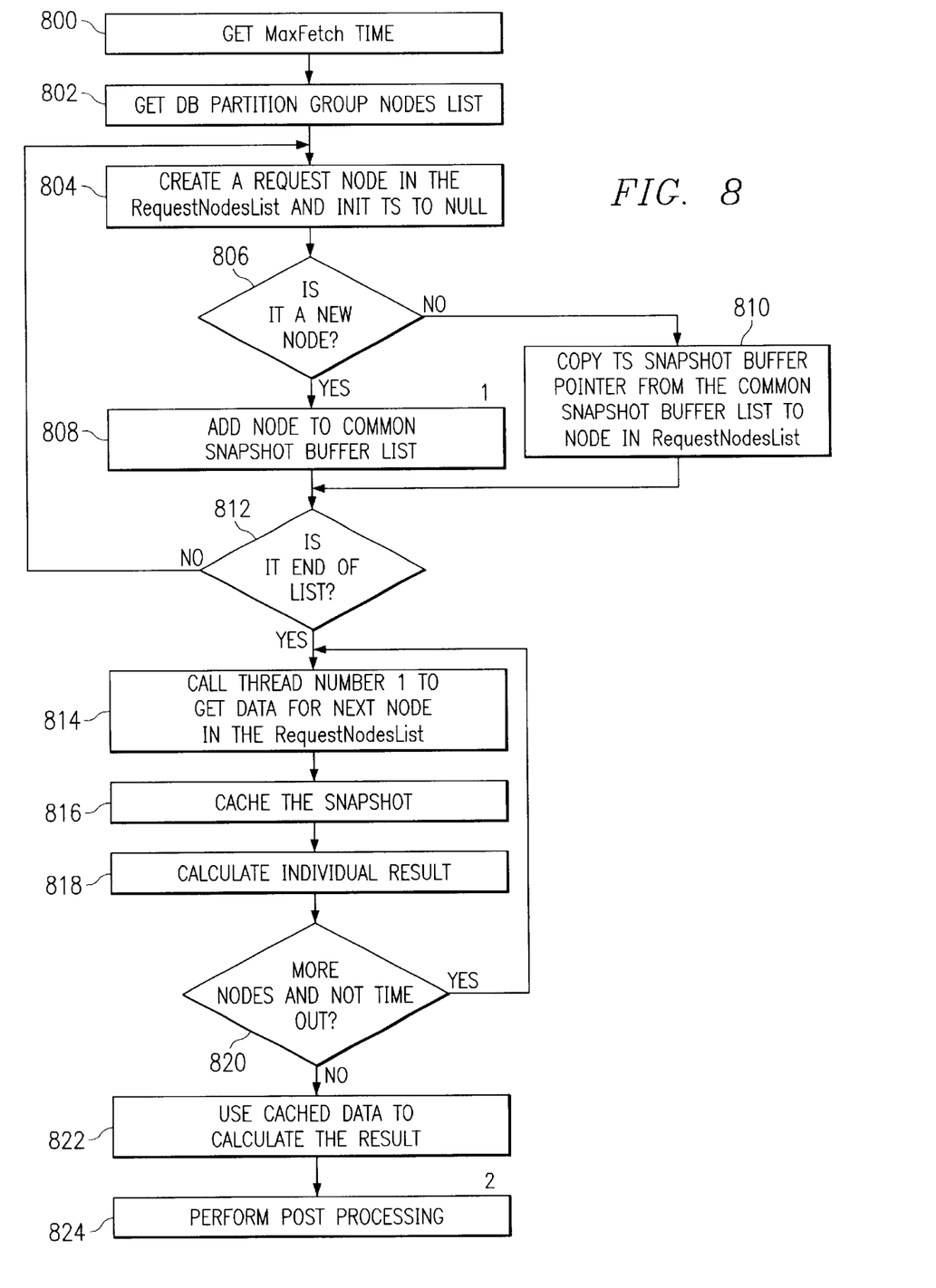
FIG. 8 is a flow diagram illustrating the steps performed by the monitoring system in accordance with the present invention.

FIG. 8 illustrates the steps performed by the monitoring system [122] in accordance with the present invention. The monitoring system [122] receives the maximum time allowed to process a monitor, e.g., a user specified time limit or a monitor specified time limit [block 800]. The monitor then receives the database partition group node list [block 802].

The monitoring system [122] creates a request node list [block 804]. The request node list is a sorted list that contains the nodes in a database group. For some of the nodes, a snapshot of performance data is cached in a snapshot buffer list. A snapshot is a picture in time of monitoring data for a particular DB2 system. In the monitoring system [122] there is a snapshot buffers list that maintains a list of DB2 snapshot buffers. The snapshot buffer list has an associated time stamp and a snapshot buffer pointer. A time stamp is the time at which the snapshot was taken. The snapshot buffer pointer contains the memory addresses for the snapshot of performance data. In the snapshot buffer list, nodes without cached data have null pointers. The nodes without cached data have a higher priority than the nodes with a cached snapshot buffer. The nodes are sorted by priority. The monitor [308] first collects database performance statistics from nodes having the higher priority, i.e., nodes without cached data. The monitor [308] refreshes the oldest snapshot data, as the time limit allows.

The monitoring system [122] decides whether the node is a new node [block 806]. If the node is a new node, the monitoring system adds the node to the snapshot buffer list [block 808]. Otherwise, the current content of the corresponding entry in the snapshot buffer list will be used in calculating the monitoring result.

The monitoring system [122] continues to determine whether all the nodes in the request node list have been processed [block 812]. If not, the monitoring system [122] creates a request node list [block 804]. Otherwise, the monitoring system [122] gets data from the next node in the sorted request node list [block 814]. A snapshot of the performance data is then cached [block 816]. The monitoring system [122] then calculates the performance value for each node [block 818]. The monitoring system [122] determines whether there are more nodes and whether there is a time out [block 820]. If there are more nodes, the monitoring system [122] gets data from the next node in the sorted request node list [block 814]. Otherwise, the monitoring system [122] uses cached data (i.e., the performance value of a database partition group) to calculate the result [block 822]. The monitoring system performs post processing [block 826]. If the maximum time allowed to process a monitor has been exceeded, the post processing may contain monitor results with nodes that contain null snapshot data.

Figure 9A:
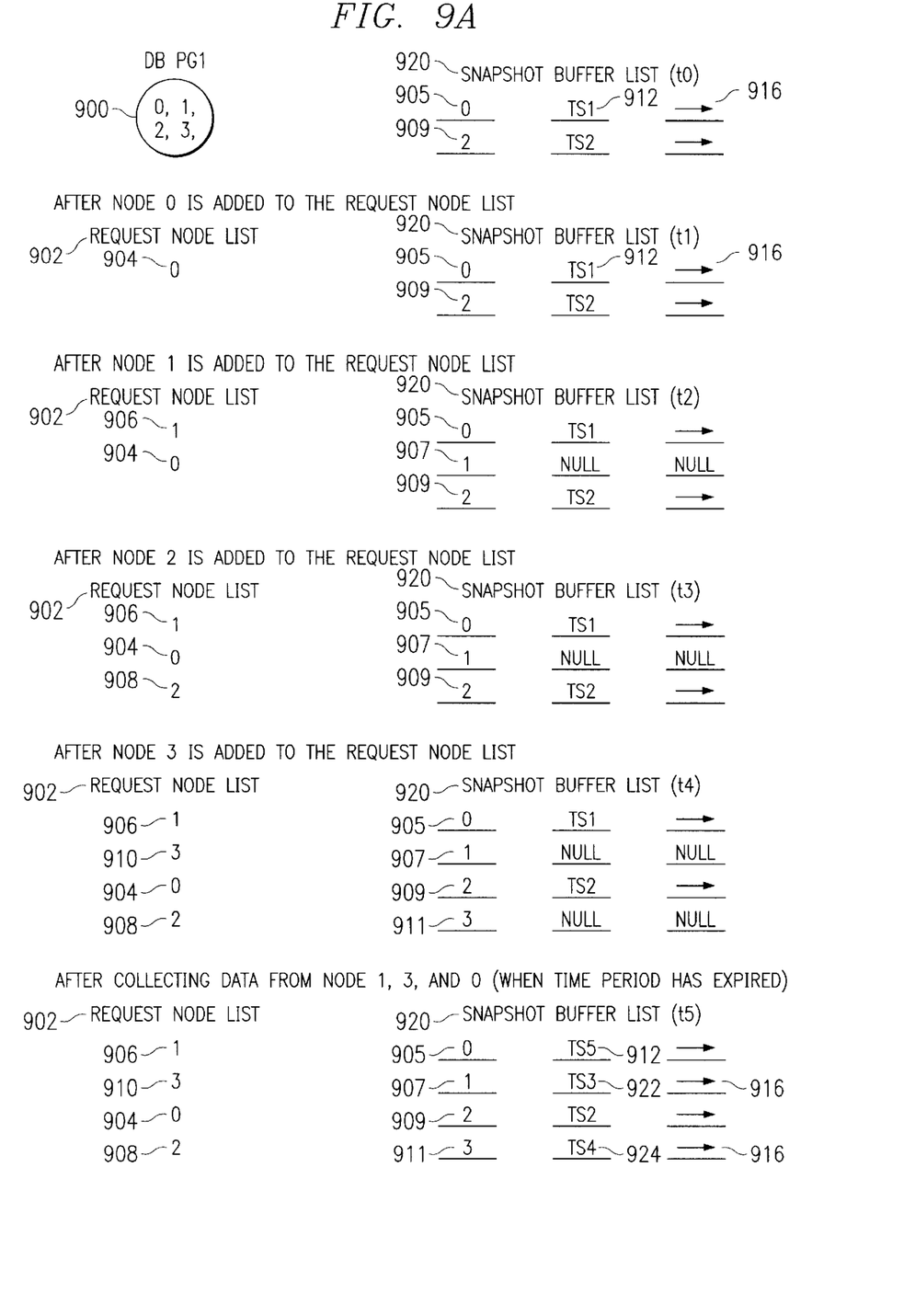
FIGS. 9A–9B show an exemplary request node list and an exemplary snapshot buffer list.
Figure 9B:
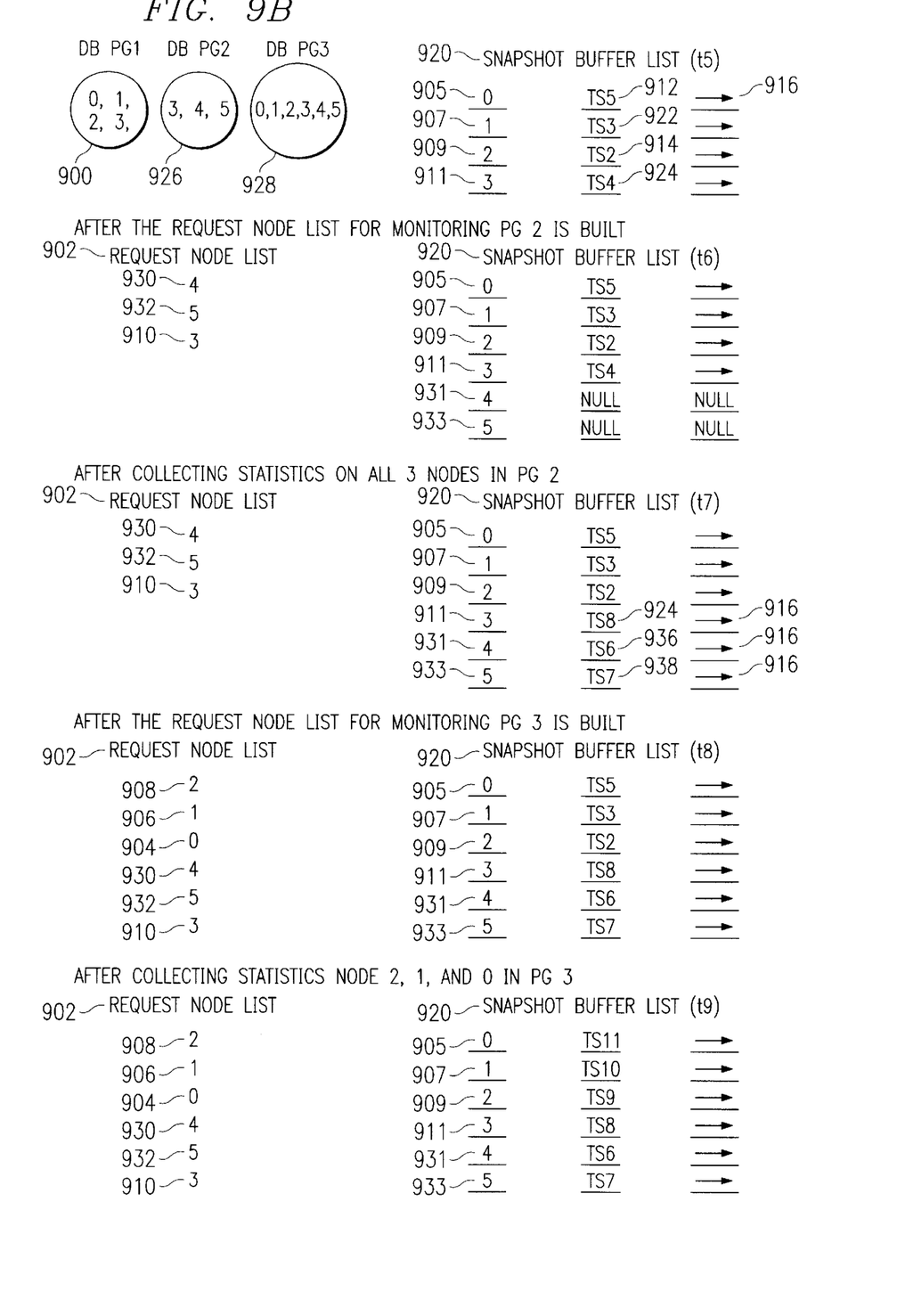

Exemplary monitor runs are shown in FIGS. 9A and 9B. In FIG. 9A, DB PG 1 [900] contains Node 0, 1, 2, and 3. Node 0 is the first node that is processed by the monitoring system [122]. The monitoring system [122] enters Node 0 [904] into the request node list [902]. The monitoring system [122] then determines whether Node 0 is a new node by searching the snapshot buffer list (t0) [920] for Node 0. In this example, Node 0 is not a new node because performance statistics for Node 0 [905] are stored in the snapshot buffer list (t0) [920]. More specifically, a time stamp (i.e., TS1 [912]) is stored in the snapshot buffer list [920]. The time stamp identifies the time at which the node performance statistics were retrieved. If a database partition group contains N nodes, then a time stamp is associated with each node such that TS1 is less than TS2 and TS2 is less than TS3 (i.e., TS1<TS2<... TSN). A pointer [916] is also stored in the snapshot buffer list [920]. The pointer [916] points to the snapshot buffer containing the performance statistics values for Node 0. For each node, the pointer [916] points to a different memory address in the snapshot buffer.

Node 1 is processed next. In this example, Node 1 is a new node that has never been processed. Thus, Node 1 [907] is added to the snapshot buffer list (t2) [920] with both the time stamp and pointer set to null. The above steps are repeated for Node 2 and Node 3. The monitor [308] sorts the request node list in the order of Node 1 [906], Node 3 [910], Node 0 [904], and Node 2 [908]. Note, the nodes with null values (i.e., Node 1 [906] and Node 3 [910]) are placed above nodes with stored performance data (i.e., Node 0 [904] and Node 2 [908]).

The monitoring system [122] processes the data sequentially, first, collecting data from the nodes with null values and second, refreshing old data values. In particular, the monitoring system collects performance statistics from Node 1 and then stores the time stamp (i.e., TS3 [922]) and the pointer [916] in the snapshot buffer list (t5) [920]. Before processing Node 3, the monitor system [122] checks whether the collection time period has expired. In this example, the collection time period expires after collecting data from three nodes. Hence, the monitoring system [122] can collect data from Node 3 [911] and refresh Node 0 [905]. Accordingly, the monitoring system [122] collects performance statistics from Node 3 [911] and then stores the time stamp (i.e., TS4 [924]) and the pointer [916] in the snapshot buffer list (t5) [920]. The monitoring system [122] refreshes the Node 0 statistics and then stores the time stamp (i.e., TS5 [912]) and the pointer [916] in the snapshot buffer list (t5) [920]. Note that the pointer [916] points to refreshed data and thus, points to a new memory location in the snapshot buffer. Therefore, the monitoring system [122] has three fresh values from Node 1 [907], Node 3 [911], and Node 0 [905], with time stamps of TS3, TS4, and TS5 respectively, and one older value from Node 2 [909] with time stamp TS2. The monitoring system [122] completes any post processing and returns the performance statistics to the user. In this example, the monitoring system [122] fulfilled the user's request without processing all nodes. The time stamps for the data ranges between TS2 and TS5.

FIG. 9B continues to show two additional database partition groups, DB PG 2 [926] and DB PG 3 [928]. DB PG 2 [926] contains Node 3, Node 4, and Node 5. Node 3 [911] has stored data with a time stamp of TS4 [924] and a pointer [916], as represented in the snapshot buffer list (t5) [920]. Node 4 [930] and Node 5 [932] are new nodes so the corresponding entries with null values are added to the snapshot buffer list (t6) [920]. The request node list [902] automatically sorts the nodes in the order of Node 4, Node 5, and Node 3. In this example, performance data can be collected from three nodes within the collection time period. Node 4 [930] and Node 5 [932] are processed first because the corresponding entries in the snapshot buffer list (t6) [920] have null values. For Node 4 [931], the time stamp TS6 [936] and the pointer [916] are stored in the snapshot buffer list (t7) [920]. For Node 5 [933], the time stamp TS7 [938] and pointer [916] are stored in the snapshot buffer list (t7) [920]. Node 3 [911] is refreshed and the time stamp TS8 [924] and the pointer [916] is stored in the snapshot buffer list (t7) [920]. For Node 3 [911], the pointer [916] points to refreshed data and thus, points to a new memory location in the snapshot buffer. During subsequent monitor runs, DB PG 2 [926] and DB PG 1 [900] can re-use the data stored in the snapshot buffer. DB PG 3 [928] may also re-use the data.

DB PG 3 [928] contains nodes zero through five. All the nodes already have entries in the snapshot buffer list (t7) [920]. The monitoring system [122] may return values for all nodes zero through five to the user. Some of the values will contain refreshed data and some of the values will contain old data. In this example, before the collection time period expires, the monitoring system [122] can fulfill the user's request by returning refreshed data for Node 2 [909], Node 1 [907], and Node 0 [905] with time stamps of TS9, TS10, and TS11 respectively, and old data for Node 4 [933], Node 5 [931], and Node 3 [911] with time stamps of TS6, TS7, and TS8 respectively. The time stamps for all six nodes range between TS6 and TS11. Without the use of dynamic grouping and sequential sampling, the monitoring system [122] may not have the data for all the nodes and some of the data may be too old to provide good monitoring measurement.

The monitoring system [122] also uses dynamic grouping to minimize performance overhead. A computer user may define a subset of the nodes at which monitoring statistics are collected. The definition of the subset could be based on how the data is distributed among the nodes. For example, a user may want to monitor the Payroll data in nodes one to five and monitor the Employee data in nodes three to six. Payroll data and Employee data will be monitored and performance statistics will be collected from the database node groups specified by the user, i.e. nodes one to five and nodes three to six. The grouping of these database nodes can be dynamic. That is, a user may initially specify that a monitor [308] run against a target database node group, and during the monitor [308] run, the user may specify that the monitor [308] run against a new target database node group. The monitor [308] can collect and share statistics from the new database node group. As an example, suppose that a user initially specifies that a monitor [308] run against database node group 1. During the monitor [308] run, the user can change the target database node group from database node group 1 to database node group 2.

Dynamic grouping is a logical grouping of one or more database nodes that can be changed dynamically by the user without impacting the monitors distributed to that group. For example, DB2 has an endpoint object named "DBPartitionGroup." An endpoint object is an example of a monitored object for which statistics are collected. The endpoint object contains a random number of nodes in a DB2 partitioned database. The same nodes in a given DB2 partitioned database may exist in different DBPartitionGroups. Hence, users are allowed to collect monitoring statistics from the nodes that they are interested in. After a monitor [308] is distributed to one or more of the defined DBPartitionGroups and that monitor [308] is run against one of the DBPartitionGroups, the monitor [308] collects and caches the data from as many of the nodes in the group as the time limit allows. As the monitor [308] runs against different DBPartitionGroups, the cached data from each node is made available to the monitors [308] that run against a group with overlapping nodes. To illustrate, a monitor [308] running against nodes one through ten can share the cached data for nodes five through ten with a monitor running against nodes five through fifteen.

If the user changes the grouping of the database nodes for a DBPartitionGroup, the monitor [308] will start collecting the statistics from a new set of nodes. Changing the grouping of the database nodes does not impact the existing monitoring activities and the monitors [308] are not redistributed to a new DBPartitionGroup. This is done by refreshing the monitored object list in the monitoring system [122]. Hence, the monitors [308] may continue to collect performance statistics without interruption.

While using dynamic grouping, a user may have the need to group a large number of nodes. To address the problem of collecting data from a large sampling size within a predefined time limit, the monitor [308] can take advantage of a multi-threaded process or multiple process to collect monitoring statistics in parallel. The performance improvement is more apparent in large parallel databases running in a massivley parallel processing environment ("MPP") or a symmetric multiprocessing environment ("SMP") environment as the work load can be spread across multiple CPUs. In MPP, a parallel database uses many separate CPUs running in parallel to support a single monitor [308]. Each CPU has its own memory. SMP is similar to MPP, but, in SMP systems, all the CPU's share the same memory.

Conclusion

This concludes the description of the preferred embodiment of the invention. The following describes some alternative embodiments for accomplishing the monitoring system [122]. For example, any type of computer, such as a mainframe, minicomputer, or personal computer, or computer configuration, such as a timesharing mainframe, local area network, or standalone personal computer, could be used with embodiments of the monitoring system [122].

In summary, a preferred embodiment of the monitoring system [122] returns precise monitoring results to a user within a specified time limit and minimizes overhead across all nodes. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of monitoring performance of a parallel database in a computer, the parallel database being stored on a data storage device in the computer, the method comprising the steps of:

identifying one or more groups of database nodes;

determining collection time periods for collecting performance statistics from the identified groups of database nodes; and periodically collecting performance statistics from a subset of each identified group of nodes during the collection time periods, wherein the collected performance statistics are stored in a cache memory of the computer and re-used when collecting performance statistics from one or more groups of database nodes in a succeeding collection time period.

2. The method of claim 1, further comprising a step of dynamically grouping one or more user selected nodes into a group.

3. The method of claim 1, further comprising a step of using the stored statistics to calculate a database performance value.

4. The method of claim 1, further comprising collecting additional performance statistics from an identified group of nodes so that statistics from all the nodes in each group are collected.

5. The method of claim 1, wherein the step of collecting database performance statistics further comprises the step of collecting database performance statistics from each group of nodes in parallel.

6. The method of claim 1, wherein the step of collecting database performance statistics further comprises the step of collecting database performance statistics from each group of nodes sequentially.

7. The method of claim 1, wherein the step of collecting database performance statistics further comprises the steps of:

defining a sample interval, wherein the sample interval defines how often database performance statistics are collected from each group; and at each defined sample interval, collecting database performance statistics from a portion of the nodes in each group of nodes as the collection time period allows.

8. The method of claim 1, wherein the stored database performance statistics are expired data, and wherein the step of collecting further comprises the steps of:

identifying nodes without stored performance statistics; and during the collection time period, performing the following steps:

collecting database performance statistics from a portion of the identified nodes as the collection time period allows, wherein the collected performance statistics are stored in the cache memory; and refreshing the expired data as the collection time period allows, wherein refreshed data is stored in a new memory location.

9. The method of claim 1, wherein each group of database nodes has a group number, the method further comprising the steps of:

for each node in each numbered group of nodes, tracking a user's request for monitoring, wherein tracking comprises the steps of:

for each node in each numbered group of nodes, storing a node number in a node list; and for each entry in the node list, storing one or more bits in a snapshot buffer list that references performance statistics for each of the nodes of the identified group.

10. An apparatus for monitoring performance of a parallel database in a computer, the parallel database being stored on a data storage device in the computer, comprising:

a computer having a data storage device connected thereto, wherein the data storage device stores a database; and one or more computer programs, performed by the computer, for identifying one or more groups of database nodes, determining collection time periods for collecting performance statistics from the identified groups of database nodes, and periodically collecting performance statistics from a subset of each identified group of nodes during the collection time periods, wherein the collected performance statistics are stored in a cache memory of the computer and re-used when collecting performance statistics from one or more groups of database nodes in a succeeding collection time period.

11. The apparatus of claim 10, further comprising a means, performed by the computer, of dynamically grouping one or more user selected nodes into a group.

12. The apparatus of claim 10, further comprising a means, performed by the computer, of using the stored statistics to calculate a database performance value.

13. The apparatus of claim 10, further comprising a means, performed by the computer, for collecting additional performance statistics from an identified group of nodes so that statistics from all the nodes in each group are collected.

14. The apparatus of claims 10, wherein the means performed by the computer for collecting database performance statistics further comprises the means for collecting database performance statistics from each group of nodes in parallel.

15. The apparatus of claim 10, wherein the means performed by the computer for collecting database performance statistics further comprises the means for collecting database performance statistics from each group of nodes sequentially.

16. The apparatus of claim 10, wherein the means performed by the computer for collecting database performance statistics further comprises:

means for defining a sample interval, wherein the sample interval defines how often database performance statistics are collected from each sub-group; and at each defined sample interval, means for collecting database performance statistics from a portion of the nodes in each group of nodes as the collection time period allows.

17. The apparatus of claim 10, wherein the stored database performance statistics are expired data, the apparatus further comprising:

means performed by the computer for identifying nodes without stored database performance statistics; and means performed by the computer during the collection time period:

means performed by the computer for collecting database performance statistics from a portion of the identified nodes as the collection time period allows, wherein the collected performance statistics are stored in the cache memory; and means performed by the computer for refreshing the expired data as the collection time period allows, wherein refreshed data is stored in a new memory location.

18. The apparatus of claim 10, wherein each group of database nodes has a group number, the apparatus further comprising:

for each node in each numbered group of nodes, means performed by the computer for tracking a user's request for monitoring, wherein tracking comprises the steps of:

for each node in each numbered group of nodes, means performed by the computer for storing a node number in a node list; and for each entry in the node list, means performed by the computer for storing one or more bits in a snapshot buffer list that references performance statistics for each of the nodes of the identified group.

19. An article of manufacture comprising a computer program carrier readable by a computer embodying one or more instructions executable by the computer to perform method steps for monitoring performance of a parallel database in a computer, the parallel database being stored on a data storage device in the computer, the method comprising the steps of:

identifying one or more groups of database nodes;

determining collection time periods for collecting performance statistics from the identified groups of database nodes; and periodically collecting performance statistics from a subset of each identified group of nodes during the collection time periods, wherein the collected performance statistics are stored in a cache memory of the computer and re-used when collecting performance statistics from one or more groups of database nodes in a succeeding collection time period.

20. The article of manufacture of claim 19, further comprising a step of dynamically grouping one or more user selected nodes into a group.

21. The article of manufacture of claim 19, further comprising a step of using the stored statistics to calculate a database performance value.

22. The article of manufacture of claim 19, further comprising collecting additional performance statistics from an identified group of nodes so that statistics from all the nodes in each group are collected.

23. The article of manufacture of claim 19, wherein the step of collecting database performance statistics further comprises the step of collecting database performance statistics from each group of nodes in parallel.

24. The article of manufacture of claim 19, wherein the step of collecting database performance statistics further comprises the step of collecting database performance statistics from each group of nodes sequentially.

25. The article of manufacture of claim 19, wherein the step of collecting database performance statistics further comprises the steps of:

defining a sample interval, wherein the sample interval defines how often database performance statistics are collected from each group; and at each defined sample interval, collecting database performance statistics from a portion of the nodes in each group of nodes as the collection time period allows.

26. The article of manufacture of claim 19, wherein the stored database performance statistics are expired data, and wherein the step of collecting further comprises the steps of:

identifying nodes without stored performance statistics; and during the collection time period, performing the following steps:

collecting database performance statistics from a portion of the identified nodes as the collection time period allows, wherein the collected performance statistics are stored in the cache memory; and refreshing the expired data as the collection time period allows, wherein refreshed data is stored in a new memory location.

27. The article of manufacture of claim 19, wherein each group of database nodes has a group number, the method further comprising the steps of:

for each node in each numbered group of nodes, tracking a user's request for monitoring, wherein tracking comprises the steps of:

for each node of each numbered group of nodes, storing a node number in a node list; and for each entry in the node list, storing one or more bits in a snapshot buffer list that references performance statistics for each of the nodes of the identified group.

* * * * *